Patented Feb. 21, 1928.

1,660,294

UNITED STATES PATENT OFFICE.

RALPH T. GOODWIN, OF ELIZABETH, NEW JERSEY, ASSIGNOR TO STANDARD OIL DEVELOPMENT COMPANY, A CORPORATION OF DELAWARE.

OIL COMPOSITION AND PROCESS OF PREPARING THE SAME.

No Drawing. Application filed January 20, 1925, Serial No. 3,595. Renewed October 12, 1927.

This invention relates to improvements in heavy hydrocarbon compositions of a type especially adapted for use as fuel oil. The invention also includes processes for preparing such compositions from carbon-forming liquid residua produced in the heat treatment of hydrocarbon oils. The process is particularly adapted for the treatment of "pressure tar", that is, the residuum resulting from the cracking of hydrocarbon oils in pressure stills, or the like. Pressure tar will therefore be referred to in the succeeding description, it being understood that analogous materials are included in the term.

Heretofore the use of pressure tar has been hampered by its formation and precipitation of relatively large amounts of solid carbon or carbonaceous sediment. This appears to be the result of a spontaneous action taking place in the tar on standing for a somewhat prolonged time. The carbon accumulates in the tar storage receptacles or supply pipes and ordinarily makes pressure tar unsalable as a fuel oil, due to stoppage of pipes, burners, etc.

In accordance with the present invention the detrimental carbon-forming bodies are removed substantially completely from the pressure tar by adding thereto a suitable amount of "acid oil". The process of effecting this change, which I term stabilization, will be described in detail later. The acid oil is preferably obtained from the process of restoring acid which has been used for treating naphtha, burning oil, lubricating oil and the like, by dilution of the acid sludge with water and separating into acid oil, tar, and weak acid. Sulfuric acid is most frequently used, but any mineral acid will ordinarily serve so far as the present process is concerned.

The properties of the pressure tar will vary within wide limits due to the character of the oil charged to the cracking equipment and method of operating the equipment, but in general the tar is characterized by a low viscosity for a given gravity as compared to the natural fractions obtained from crude oil.

It will also be understood that acid oil will vary greatly in physical properties depending on the nature of the stock treated with acid, from which the acid sludge is produced.

While as little as 1% of acid oil is sufficient to precipitate the carbon-forming bodies, any desired larger quantity may be used. The addition of large amounts of the acid oil provides a useful outlet for this material. I generally use from 15 to 25% by weight of acid oil, as this proportion gives a freely flowing composition of good quality for fuel oil.

The stabilizing of the pressure tar is preferably accomplished by mixing the desired amount of acid oil with it, the temperature of the mixture being advantageously somewhat elevated, say about 100° to 150° F. However, mixing at ordinary temperature will serve. The composition may be allowed to stand and settle until the carbon-forming bodies have been precipitated. This ordinarily requires from 1 to 6 hours. The clear liquid may then be suitably separated, as by siphoning off, decantation or filtration. In some separation processes, especially filtering, a pulverulent or granular material, such as powdered coke or the like, may be added to aid in the removal of the suspended particles of carbon. A more rapid sedimentation can be obtained by the use of settling devices such as thickeners, classifiers, and the like.

The following example is illustrative of the invention: 13.3° A. P. I. pressure tar having a furol viscosity of 17, was treated with 20% by weight of 32.2° A. P. I. acid oil containing 0.4% free sulfuric acid. This mixture was heated to 200° F. and agitated at this temperature for two hours. The mixture was allowed to settle, thereby depositing carbon and carbon forming materials. The clear stabilized oil was separated from the carbon-like sediment by decantation.

The liquid product is a stable composition suitable for fuel oil. It shows no tendency to form further precipitate even after prolonged standing.

Fuel briquettes may be made from the deposited sediment. The manufacture of briquettes is especially advantageous when powdered coke or the like has been used in the separation.

Various changes may be made in the described embodiment of the invention within the scope of the appended claims, in which it is my intention to claim all novelty inherent in the invention as broadly as the prior art permits.

In my application Serial #25,941 of

April 25, 1925, I have described and claimed broadly the treatment of pressure tar with dilute acidic bodies.

I claim:

1. In a process of preparing a hydrocarbon oil composition, the steps of mixing a heavy oil, normally characterized by formation of carbonaceous sediment on prolonged standing, with an oil containing a small percentage of a mineral acid, whereby a relatively rapid precipitation of the sediment is obtained, and withdrawing the clear liquid from the precipitated sediment.

2. In a process of preparing a heavy hydrocarbon oil composition, the steps of mixing a heavy oil, normally characterized by formation of carbon on prolonged standing, with an oil containing a small percentage of a mineral acid, whereby a relatively rapid precipitation of carbon is obtained, adding an inert granular material to the mixture, and separating the solids from the oil.

3. The invention according to claim 2, in which the inert granular material is powdered coke, and the mixture of carbon and coke separated is formed into fuel briquettes.

4. In a process of preparing a fuel oil composition, the steps of mixing pressure tar with acid oil, allowing the mixture to stand with precipitation of carbonaceous sediment, and withdrawing the clear liquid.

5. A composition comprising a stabilized heavy hydrocarbon oil and an oil containing a small percentage of a mineral acid.

6. A composition comprising stabilized pressure tar and acid oil.

7. A composition comprising stabilized pressure tar and acid oil in amount not more than 25% by weight.

8. A composition comprising stabilized pressure tar and about 1% by weight of acid oil.

RALPH T. GOODWIN.